(12) United States Patent
Fuentes

(10) Patent No.: US 10,029,362 B2
(45) Date of Patent: Jul. 24, 2018

(54) WELDING WOOD CREEPER RECLINER

(71) Applicant: Neyda Yadira Fuentes, New Braunfels, TX (US)

(72) Inventor: Neyda Yadira Fuentes, New Braunfels, TX (US)

( * ) Notice: Subject to any disclaimer, the term of this patent is extended or adjusted under 35 U.S.C. 154(b) by 107 days.

(21) Appl. No.: 14/802,217

(22) Filed: Jul. 17, 2015

(65) Prior Publication Data
US 2017/0014991 A1    Jan. 19, 2017

(51) Int. Cl.
*B25H 5/00* (2006.01)
*B23K 37/00* (2006.01)
*A47C 9/02* (2006.01)

(52) U.S. Cl.
CPC ............... *B25H 5/00* (2013.01); *A47C 9/027* (2013.01); *B23K 37/00* (2013.01)

(58) Field of Classification Search
CPC ...................................................... B25H 5/00
See application file for complete search history.

(56) References Cited

U.S. PATENT DOCUMENTS

| | | | | |
|---|---|---|---|---|
| 2,210,585 A | * | 8/1940 | Hulbert | B25H 5/00 188/5 |
| 4,895,380 A | * | 1/1990 | Brooks | B25H 5/00 280/32.6 |
| 6,578,857 B1 | * | 6/2003 | Whiteside | B25H 5/00 280/32.5 |
| 7,025,421 B1 | * | 4/2006 | Fowler | A47C 1/026 297/325 |
| 2016/0039088 A1 | * | 2/2016 | Blasjo | B25H 5/00 280/32.6 |

* cited by examiner

*Primary Examiner* — Sarah B McPartlin

(57) ABSTRACT

The welding Wood Creeper Recliner is designed for the welding field, focusing on the overhead welding. This creeper comprise on the frame, the back-receiving and the sitting part which are made of wood allowing the use of the electric equipment without the risk of electrocution as would be with metal material. The frame it is the base of the creeper, the seating-part it is mounted on top of the frame which it is elevated to prevent the user to slide forward and the back-receiving has a reclining mechanic system designed to lounge to seven position depending on height of the project. Additionally this wood creeper has a four caster wheels allowing the user to move without stopping the welding procedure.

1 Claim, 16 Drawing Sheets

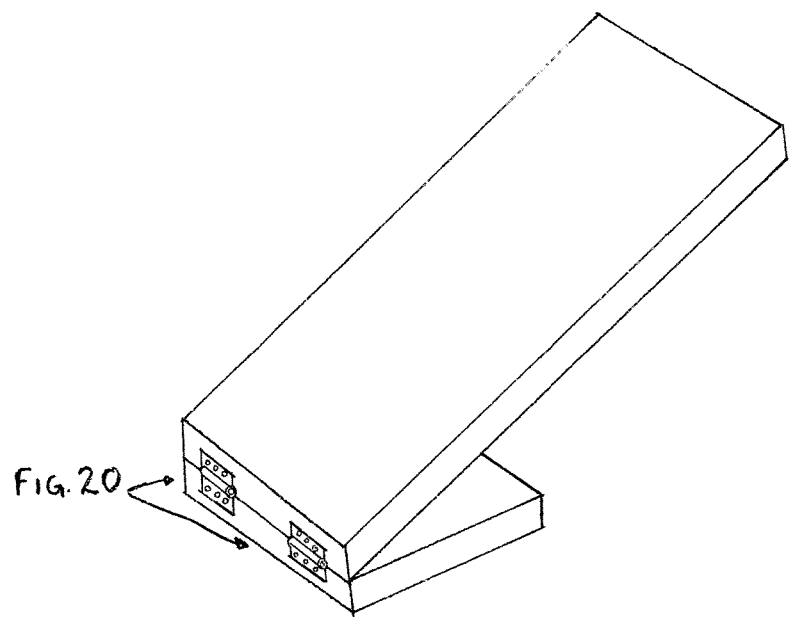
FIG. 20
FIG. 21
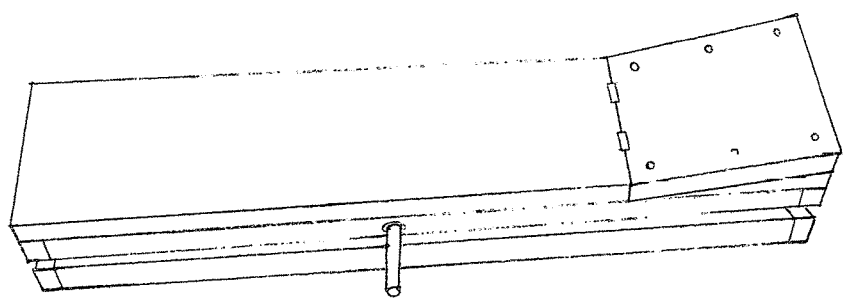

WELDING WOOD CREEPER RECLINER

BRIEF DESCRIPTION OF THE DRAWINGS

FIG. 20: Shows two hinges connecting a wooden board with a substantially square shape and a wooden board with a rectangular shape.

FIG. 21: Shows the connected wooden board with square shape and a wooden board with a rectangular shape mounted and screwed to the elevated front-part.

DETAILED DESCRIPTION OF THE INVENTION

Figure 1:
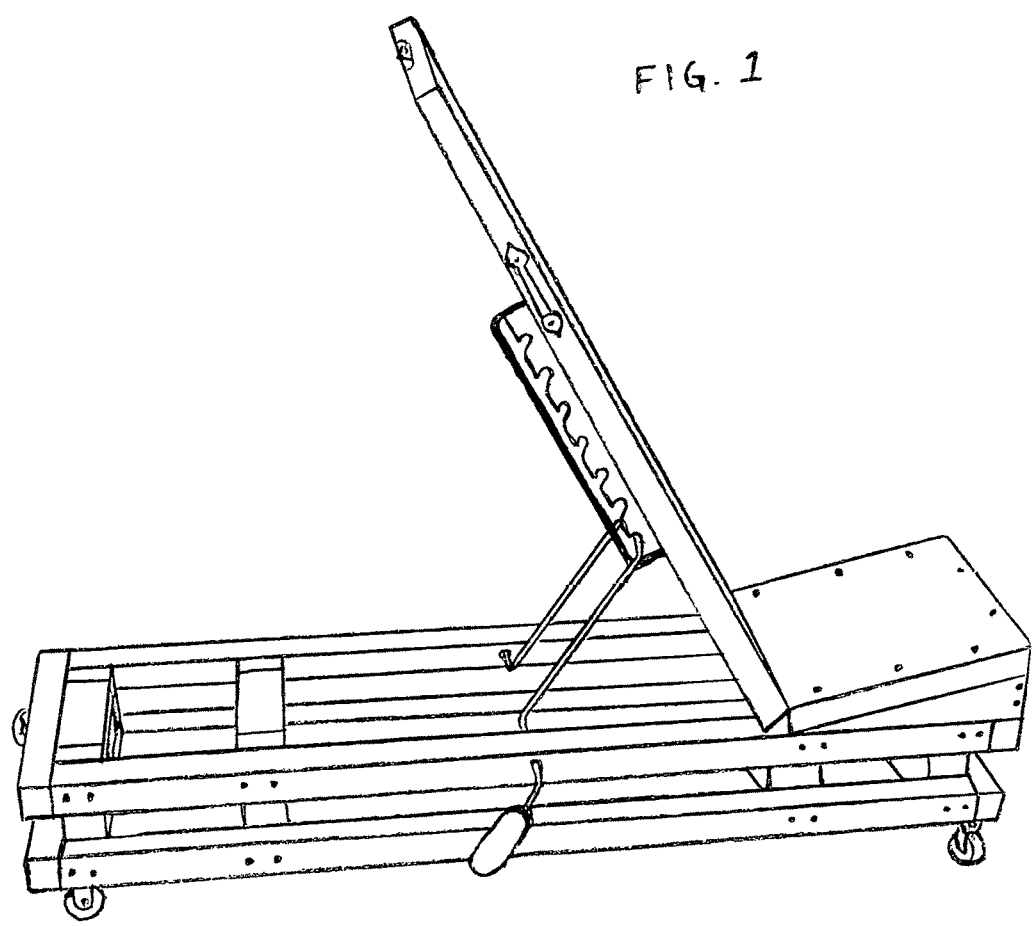
FIG. 1: Shows a finished product of a Welding Wood Creeper Recliner.
Figure 2:
FIG. 2: Shows a wooden rectangular frame creating the bottom-base a Welding Wood Creeper Recliner.
Figure 3:
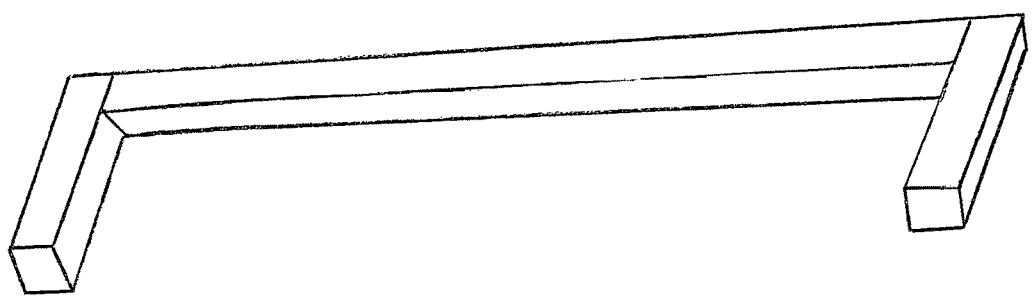
FIG. 3: Shows a rectangular unfinished-frame forming the unfinished upper-base of a Welding Wood Creeper Recliner.
Figure 4:
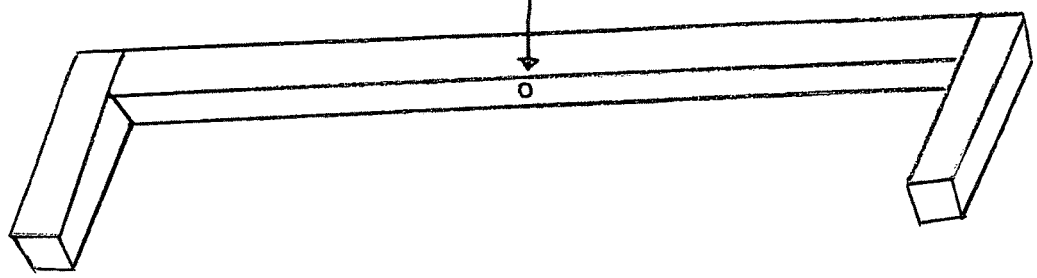
FIG. 4: Shows a midway hole drilled in the middle of the wooden unfinished-frame.
Figure 5:
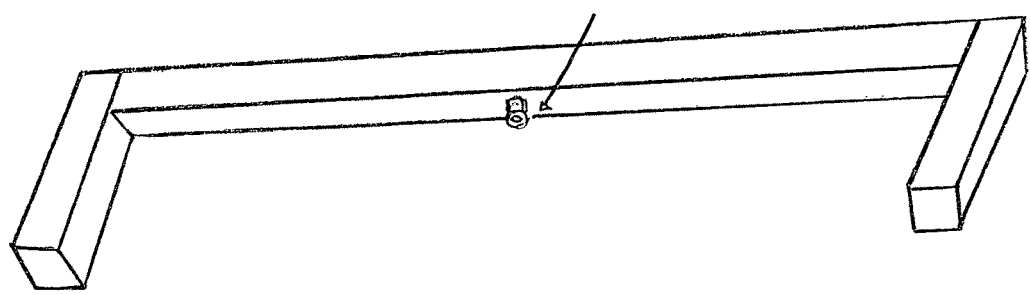
FIG. 5: Shows a flanged carbon steel bushing inserted in to the midway hole drilled in the middle of the wooden unfinished-frame
Figure 6:
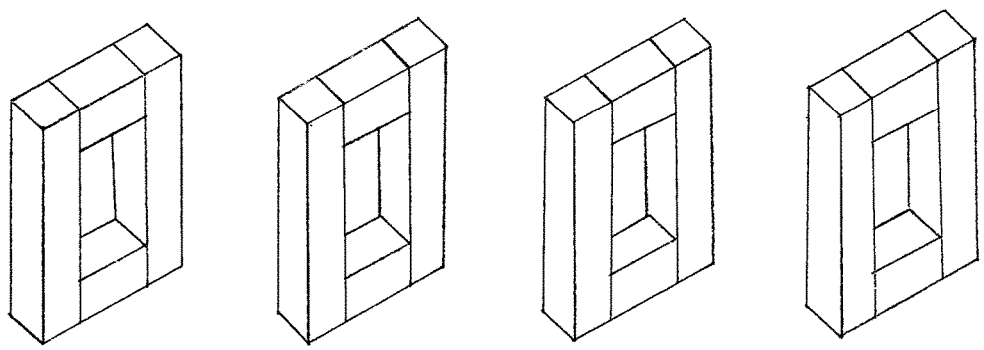
FIG. 6: Shows four wooden frames built in similar shapes and measurements.
Figure 7:
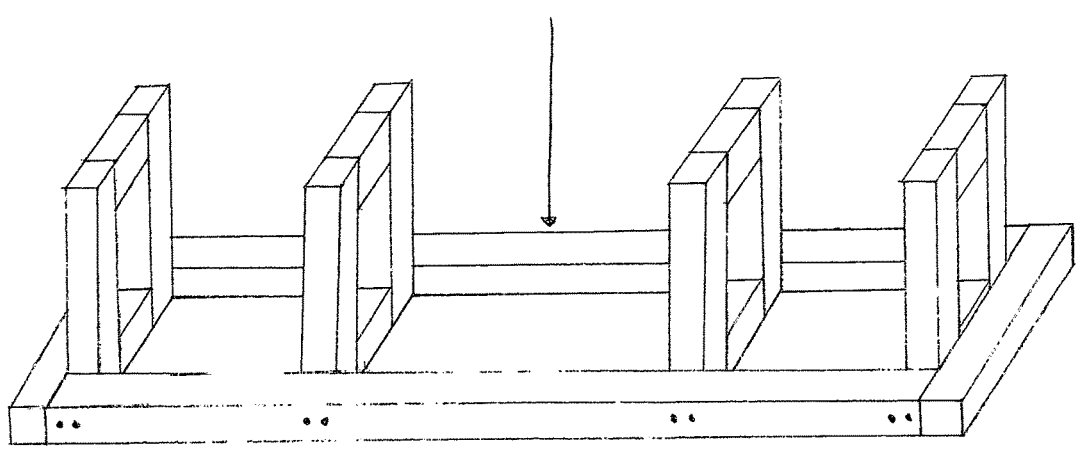
FIG. 7: Shows four wooden frames placed on a vertical position and screwed in the inner-side of the bottom-base of a Welding Wood Creeper Recliner.
Figure 8:
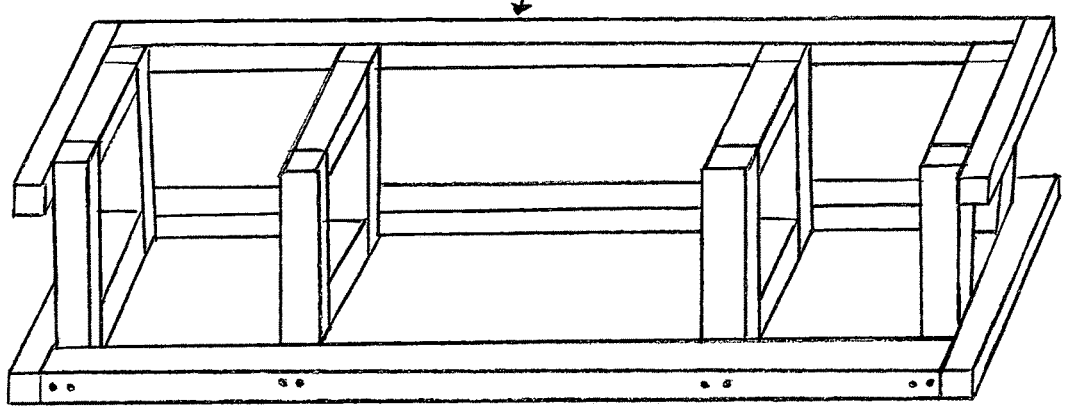
FIG. 8: Shows an unfinished rectangular frame screwed on the external upper-end of the four wooden frames.
Figure 9:
FIG. 9: Shows an un-attached wooden board with a hole drilled in the center of the board.
Figure 10:
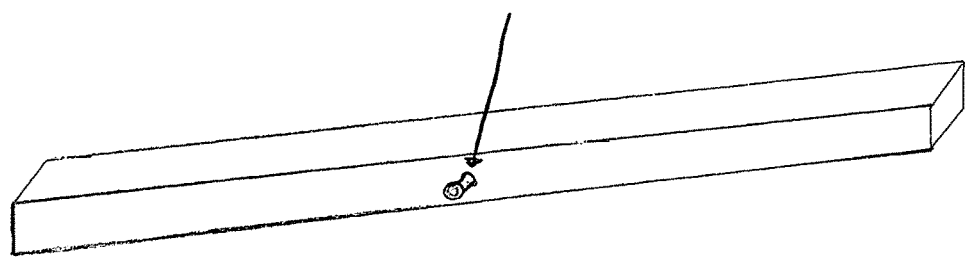
FIG. 10: Shows a flanged carbon steel bushing inserted in the hole drilled to the un-attached wooden board.
Figure 11:
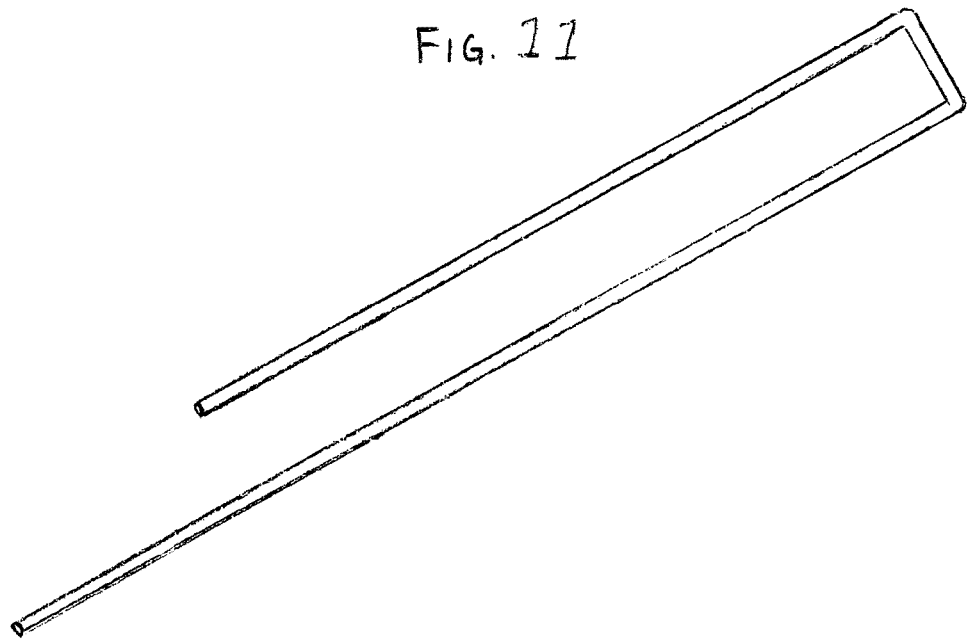
FIG. 11: Shows a carbon cold roller rod bended in a letter U upside-down shape.
Figure 12:
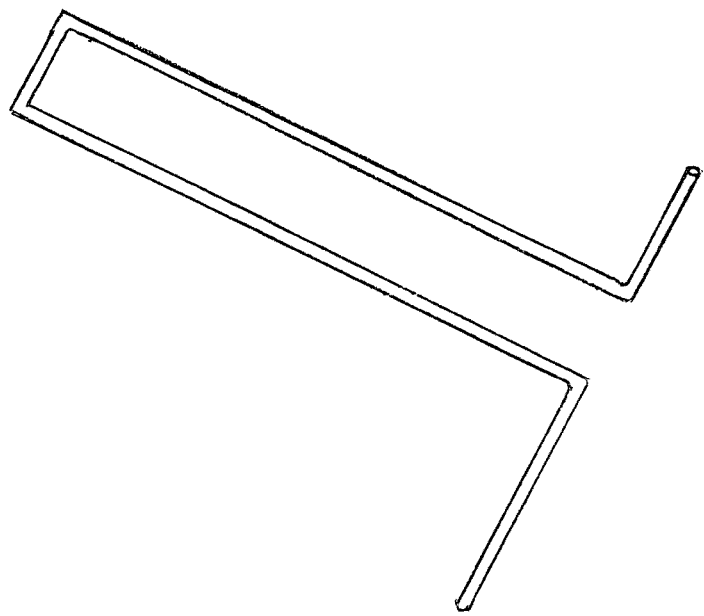
FIG. 12: Shows the ends of carbon cold roller rod with letter U upside-down shape bended 90-degrees on opposite direction forming a pivot hinge.
Figure 13:
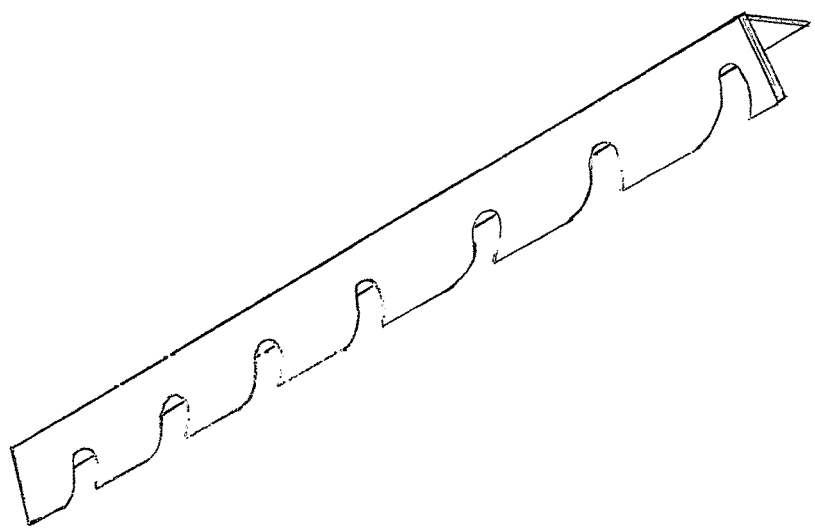
FIG. 13: Shows a carbon steel angle with a notch cut at an angle facing-down made in one side of the carbon steel angle.
Figure 14:
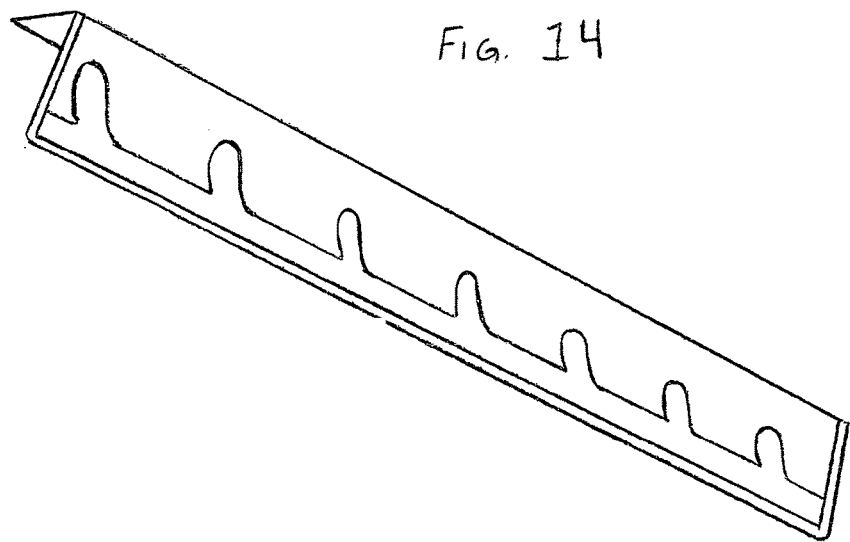
FIG. 14: Shows a carbon cold roller rod bended and welded to both ends of the carbon steel angle creating a gap between the carbon steel cold roller rod and the carbon steel angle.
Figure 15:
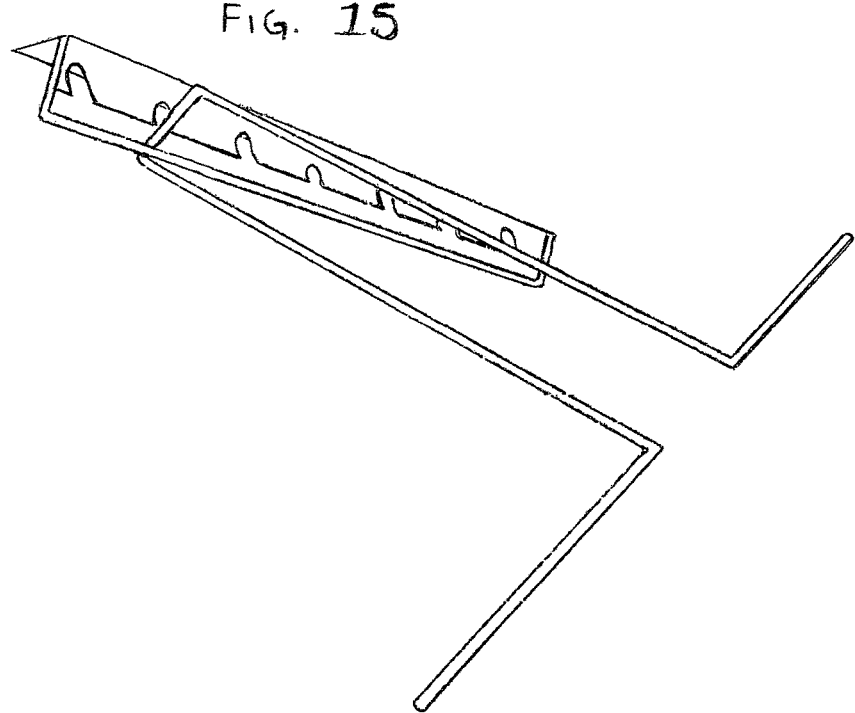
FIG. 15: Shows the carbon steel cold roller rod pivot hinge inserted through the gap between the carbon steel angle and the cold roller rod crating a pivot system.
Figure 16:
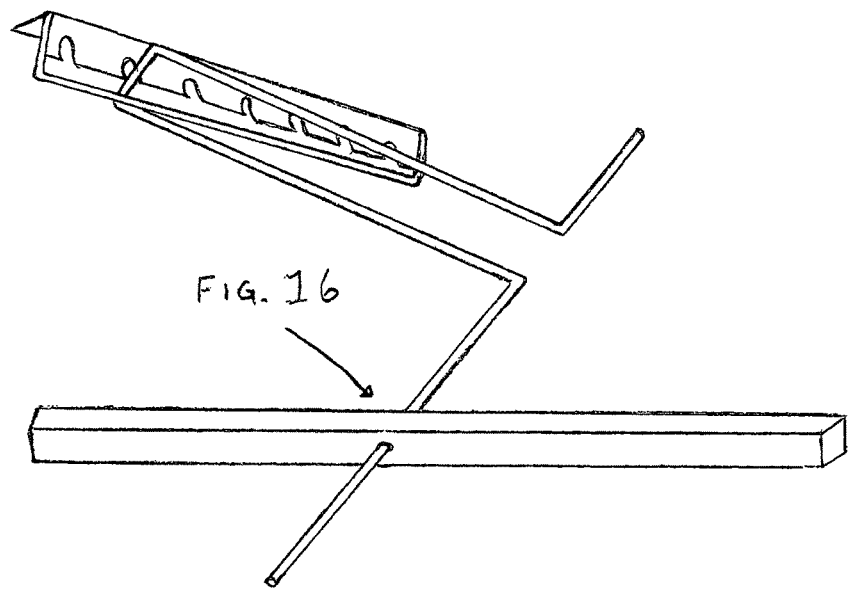
FIG. 16: Shows the carbon steel cold roller rod of the pivot system passing through the flanged carbon steel bushing inserted to the wooden board.
Figure 17:
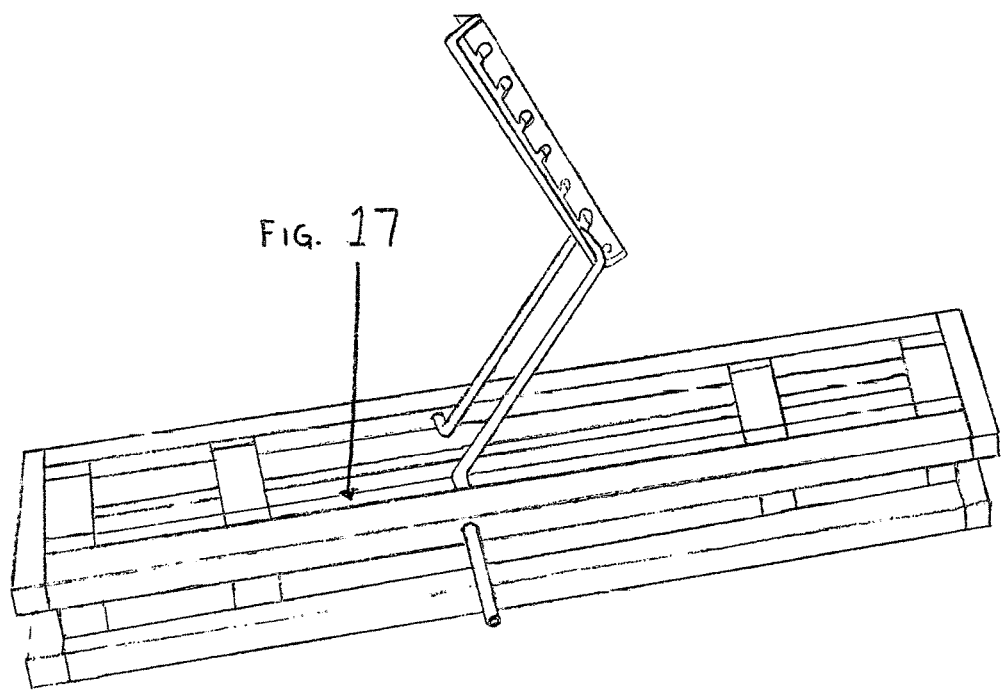
FIG. 17: Shows the wooden board screwed to the unfinished frame finalizing the upper-base of a Welding Wood Creeper Recliner.
Figure 18:
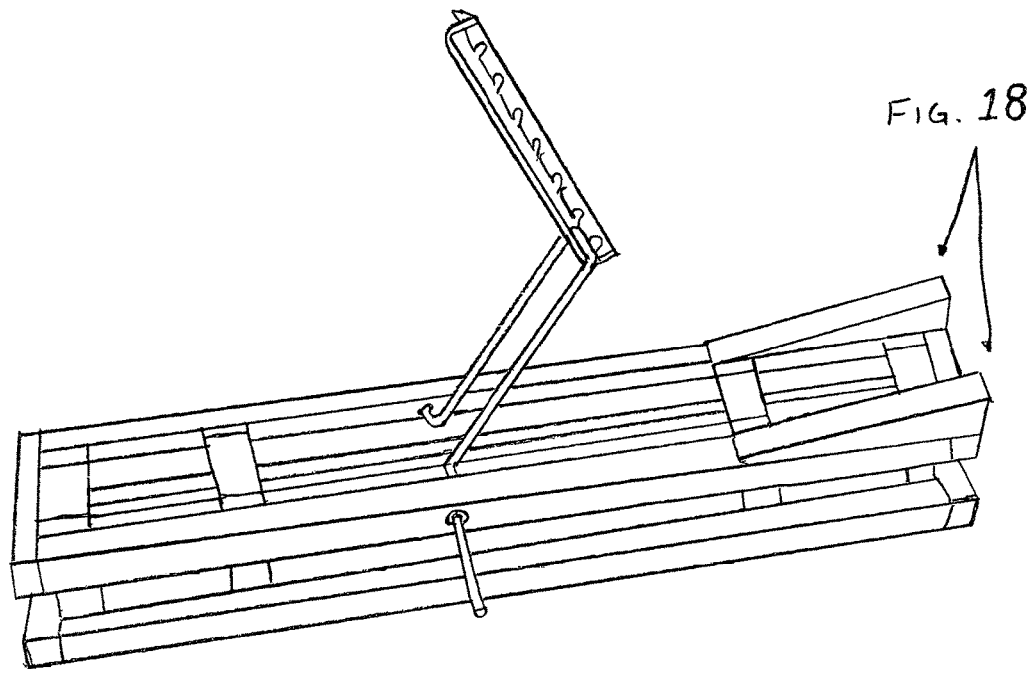
FIG. 18: Shows two wooden boards built with an angle shape screwed each wooden angle on both sides of the upper-base forming an elevation toward the front part.
Figure 19:
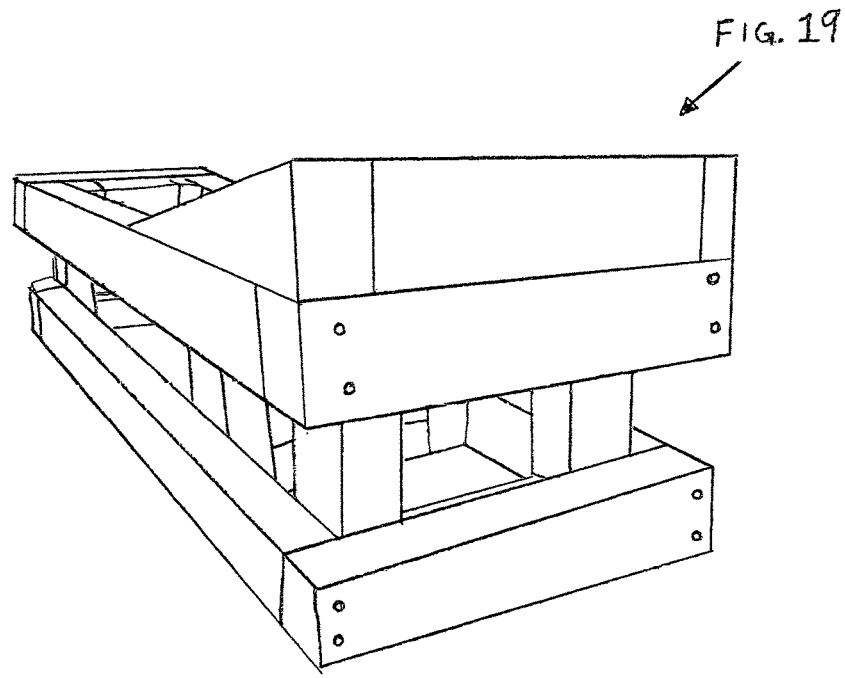
FIG. 19: Shows a rectangular small board screwed between both wooden angle boards on the front part of the upper-base.
Figure 22:
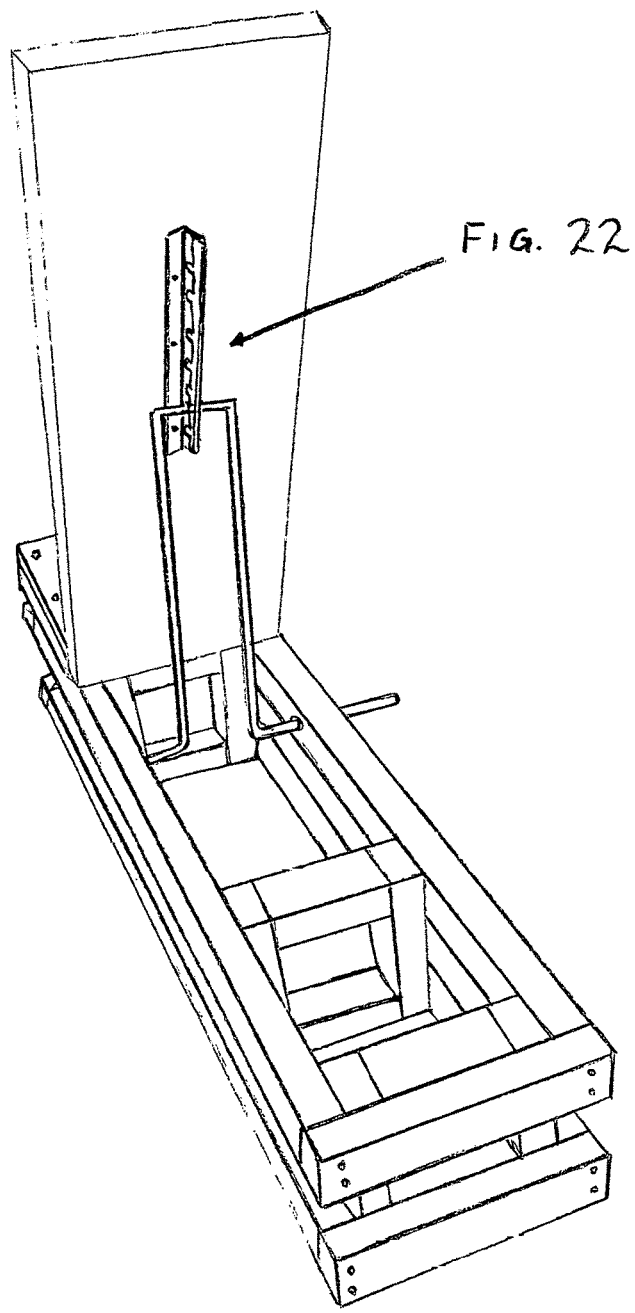
FIG. 22: Shows a pivot system screwed behind the backrest.
Figure 23:
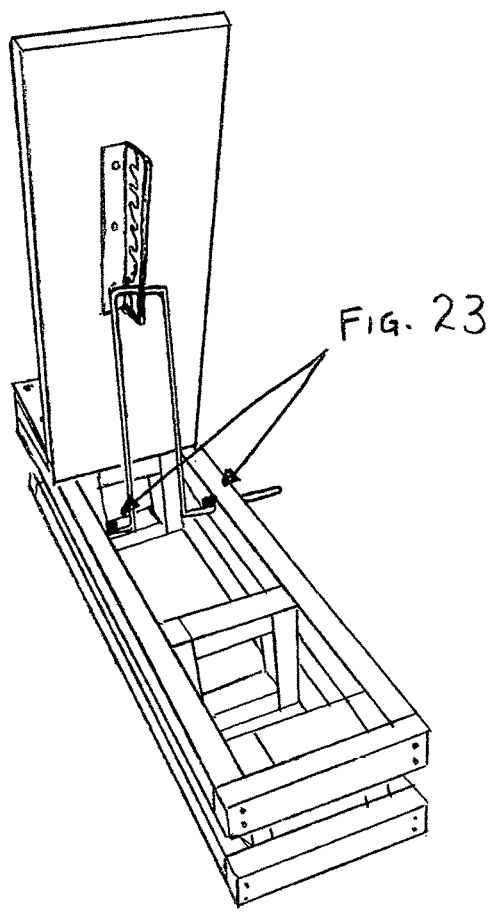
FIG. 23: Shows two small pieces of a flat carbon bar welded on the carbon cold roller rod before the flanged carbon steel bushings inserted in both inner-side of the upper-base.
Figure 24:
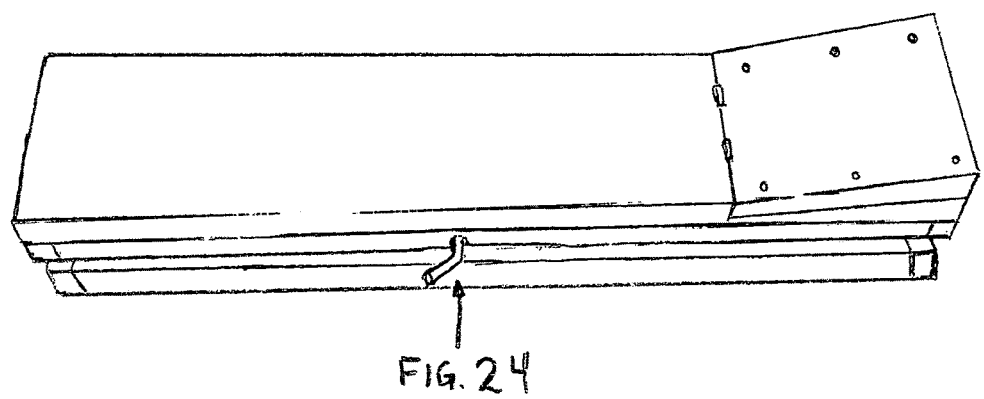
FIG. 24: Shows carbon cold roller rod bended 90-degrees creating a handle to adjust the pivot system.
Figure 25:
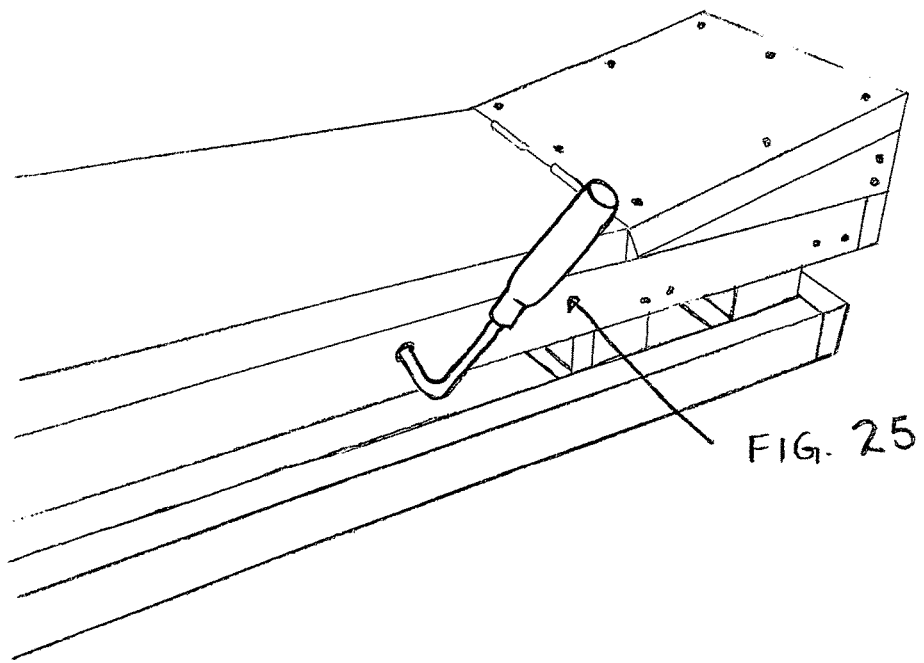
FIG. 25: Shows a wooden handle hard-pressed and glued to the bended part of the carbon cold roller rod.
Figure 26:
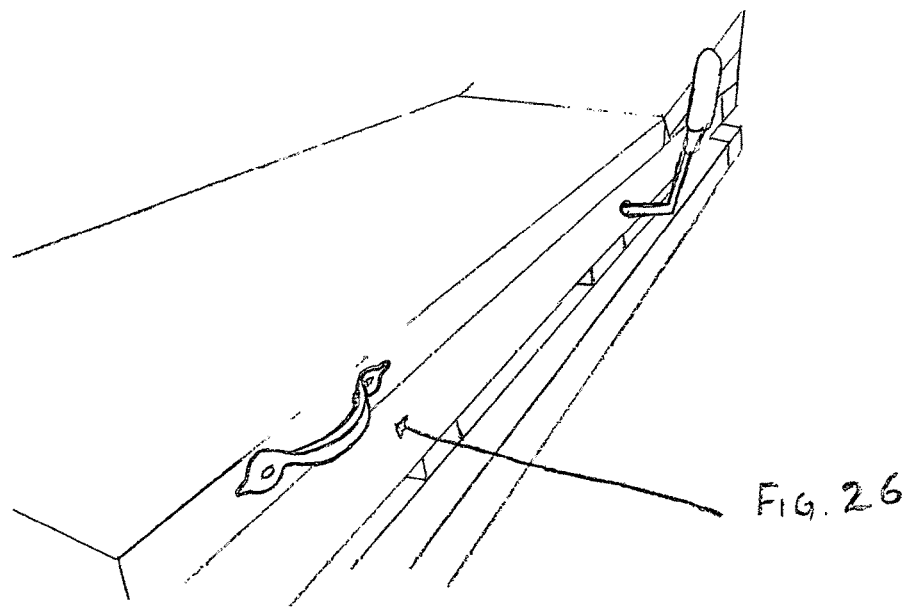
FIG. 26: Shows an arch pull handle screwed to the side of backrest of a Welding Wood Creeper Recliner.
Figure 27:
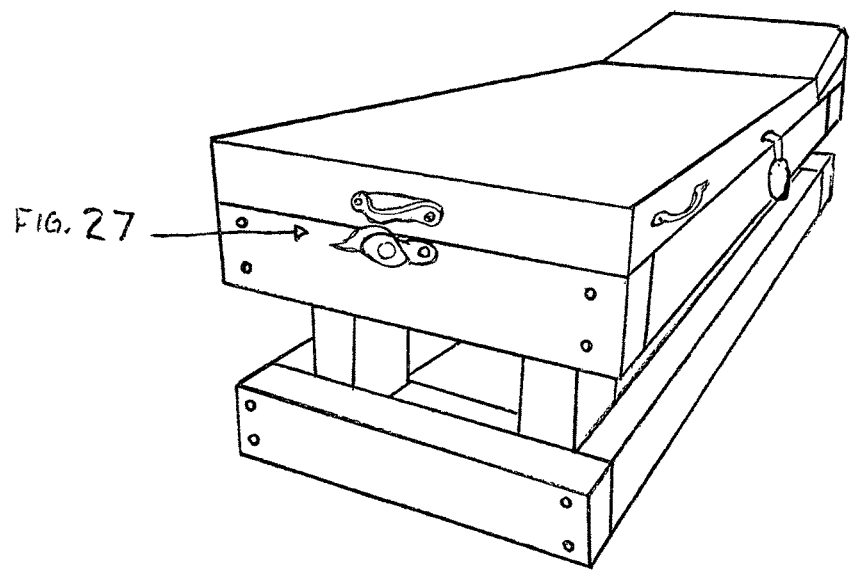
FIG. 27: Shows a brash sash lock wherein one section is screwed to the backrest and the other section of the brash sash lock is screwed to the back-part of the upper-base.
Figure 28:
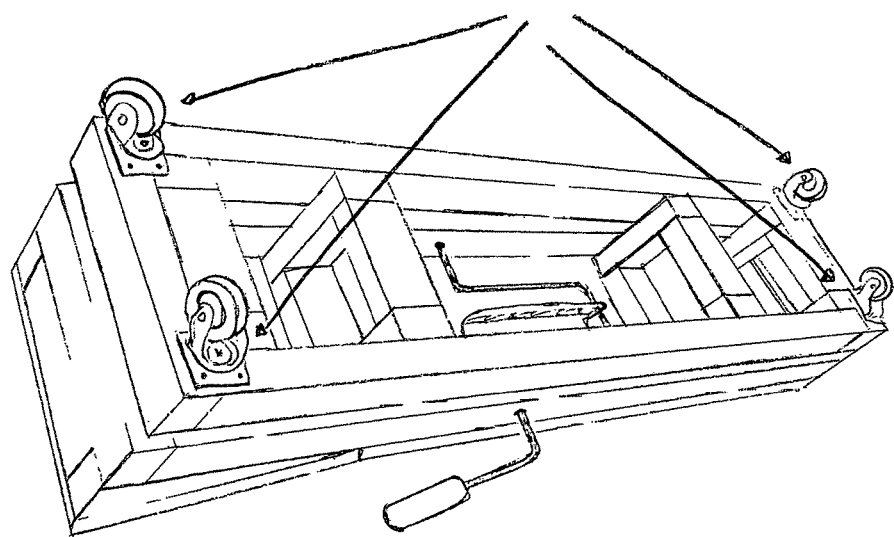
FIG. 28: Shows four caster wheels screwed to the four corners under the bottom base of a Welding Wood Creeper Recliner.
Figure 29:
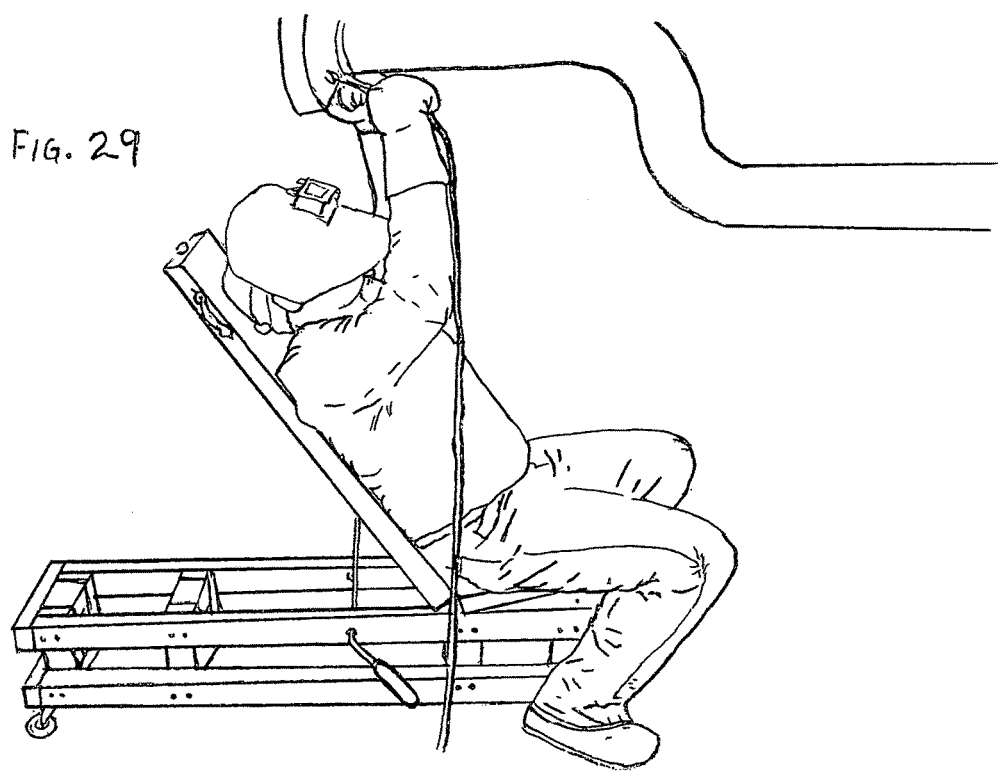
FIG. 29: Shows a person leaning on top of the Welding Wood Creeper Recliner welding under a pipe line.

A Welding Wood Creeper Recliner is designed for the welding procedure providing a pivot system to change in seven positions; this welding creeper it is not only efficient, but also it is secured with the electrical equipment used for the welding procedures since the wooden material used to construct this welding creeper is not a conductor of energy. Therefore the wood creeper includes two long side wooden boards and two short lateral wooden boards screwed together forming a rectangular frame positioned in a horizontal orientation to create a bottom base. The wood creeper further includes two long side wooded boards and two short lateral wooden boards screwed together to form an upper base. The upper base is attached to and spaced apart from the bottom base by four wooden frames. Each of the four wooden frames are screwed in the inner side of the bottom base and positioned in a vertical orientation. Two of the four frames are positioned toward a front of the bottom base. The other two of the four frames are positioned toward a rear of the bottom base. The upper base is attached to upper tops of each of the four frames, thereby spacing the upper base apart from the bottom base. In addition, a pivot system is constructed with a carbon steel angle which on one side includes a series of downwardly angled notches. A carbon steel roller rod is welded to both ends of the carbon steel angle providing a gap between the carbon steel angle and carbon steel roller rod. An additional carbon steel roller rod is bent making a pivot hinge which passes though the gap provided between the steel angle and the welded steel cold rolled rod and is adapted to engage with the notches. Furthermore, one end of the additional carbon steel cold roller rod it is inserted to a bushing hard-pressed to a hole drilled half way along the length of one long side of the upper base and the other end of the steel cold roller rod passes through another bushing hard-pressed into a corresponding hole drilled into the second long side frame of the upper base.

In addition, two wooden angles are screwed on both sides of a front of the upper-base forming an elevation toward the front of the upper-base on a substantially square board it is screwed. The substantially square wooden board is connected with two hinges to a rectangular wooden board wherein the rectangular board provides a backrest and substantially square board provides a seating-part of the welding wood creeper recliner. A portion of the carbon steel cold roller rod is best to form a handle shape with wooden handle attached thereto, wherein the handles is used to adjust the position of the backrest. In addition, an arch pull-handle it is screwed to a side of backrest and a part of a sash lock is screwed to the rear part of the backrest and is adapted to engage with a corresponding part of the sash lock screwed to a rear-part of the upper-base. Four 2.50-inches caster wheels are screwed to each corner under the bottom-base and provide the ability to slide welding wood creeper recliner

The invention claimed is:

1. A welding wood creeper recliner comprising:
a rectangular wooden base frame;
a rectangular wooden upper frame with a halfway hole drilled in each of two opposite sides;
four wooden frames each screwed at a lower end to an inner side of the rectangular base frame and at an opposite upper end to an inner side of the rectangular wooden upper frame;
a wooden sitting part disposed at one end of the rectangular wood upper frame, wherein the wooden sitting part extends at a downwardly sloping angle from outer end with respect to an upper surface of the rectangular wooden upper frame;
a wooden backrest hingedly attached at an end of the wooden sitting part;
a perforated angle attached to a rear surface of the backrest;
a cold roller round rod attached to each end of the perforate angle;
a bent roller round rod which extends through one of said halfway holes, through a gap provided between the perforated angle and the cold roller round rod and through the other of said halfway holes, wherein a wooden handle is attached to a free end of the bent roller round rod and adjustment of the bent roller round rod with respect to the perforated angle alters an inclination of the backrest with respect to the rectangular wooden upper frame and the wooden sitting part;
four caster wheels mounted to an underside of the rectangular wooden base frame;
an arch pull handle screwed to a side of the backrest; and
a brass sash lock which locks an upper end of the backrest to an end of the rectangular wooden upper frame opposite to the wooden sitting part, wherein the welding wood creeper recliner enables a user to more safely use electric equipment while welding without a risk of electrocution.

* * * * *